US012756650B2

(12) United States Patent
Sugiyama et al.

(10) Patent No.: US 12,756,650 B2
(45) Date of Patent: Oct. 6, 2026

(54) COMMUNICATION RELAY DEVICE

(71) Applicant: TOYOTA JIDOSHA KABUSHIKI KAISHA, Toyota (JP)

(72) Inventors: Kazuya Sugiyama, Nisshin (JP); Hiroya Andou, Toyota (JP); Daisuke Takaishi, Anjo (JP); Shingo Tomida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 18/895,859

(22) Filed: Sep. 25, 2024

(65) Prior Publication Data

US 2025/0150379 A1 May 8, 2025

(30) Foreign Application Priority Data

Nov. 7, 2023 (JP) ................................ 2023-190042

(51) Int. Cl.
*H04L 43/50* (2022.01)
*H04L 43/0888* (2022.01)
*H04L 43/16* (2022.01)

(52) U.S. Cl.
CPC .......... *H04L 43/50* (2013.01); *H04L 43/0888* (2013.01); *H04L 43/16* (2013.01)

(58) Field of Classification Search
CPC ..... H04L 43/16; H04L 43/50; H04L 43/0876; H04L 43/0888; H04L 41/082; H04L 41/0813; H04L 12/28; H04L 12/40; B60R 16/023
USPC .......................................................... 709/224
See application file for complete search history.

(56) References Cited

U.S. PATENT DOCUMENTS

| | | | | |
|---|---|---|---|---|
| 11,916,939 | B2 * | 2/2024 | Sun | H04L 63/1416 |
| 2011/0211585 | A1 * | 9/2011 | Kodaka | H04L 45/00 370/401 |
| 2012/0002587 | A1 * | 1/2012 | Kito | H04B 7/155 370/315 |
| 2013/0305357 | A1 * | 11/2013 | Ayyagari | H04L 41/069 726/22 |
| 2019/0116544 | A1 * | 4/2019 | Glottmann | H04W 40/30 |
| 2022/0030014 | A1 * | 1/2022 | Potluri | H04L 63/1416 |
| 2022/0385553 | A1 * | 12/2022 | Adachi | H04L 12/28 |
| 2022/0408285 | A1 * | 12/2022 | Hong | H04L 27/26025 |

(Continued)

FOREIGN PATENT DOCUMENTS

| | | |
|---|---|---|
| JP | 2004-030287 A | 1/2004 |
| JP | 2013-106203 A | 5/2013 |

(Continued)

*Primary Examiner* — James N Fiorillo
(74) *Attorney, Agent, or Firm* — SoraIP, Inc.

(57) ABSTRACT

A communication relay device relays transmission and reception of data between a plurality of control devices on an in-vehicle network. The communication relay device determines that communication is abnormal when an index value indicating a traffic volume per unit time of the data being relayed is greater than a specified value. The communication relay device acquires service information for each of the control devices, the service information being information indicating a type of a function being executed by the control device. The communication relay device sets a value of the specified value according to a plurality of pieces of the acquired service information.

7 Claims, 3 Drawing Sheets

(56) References Cited

U.S. PATENT DOCUMENTS

| | | | | |
|---|---|---|---|---|
| 2023/0336576 | A1* | 10/2023 | Suzuki | H04L 12/2823 |
| 2024/0031874 | A1* | 1/2024 | Liu | H04W 28/24 |
| 2024/0291713 | A1* | 8/2024 | Go | B60R 16/023 |
| 2024/0305524 | A1* | 9/2024 | Go | H04L 41/0813 |

FOREIGN PATENT DOCUMENTS

| | | | |
|---|---|---|---|
| JP | 2022-168353 | A | 11/2022 |
| JP | 2023-011051 | A | 1/2023 |
| WO | 2022/137916 | A1 | 6/2022 |

* cited by examiner

TS

| | FIRST OPERATION MODE | SECOND OPERATION MODE | THIRD OPERATION MODE |
|---|---|---|---|
| FIRST CONTROL DEVICE | FUNCTION A | FUNCTION A | FUNCTION B |
| SECOND CONTROL DEVICE | FUNCTION C | FUNCTION D | FUNCTION E |
| THIRD CONTROL DEVICE | FUNCTION F | FUNCTION F | FUNCTION G |
| COMMUNICATION RELAY DEVICE | FUNCTION H | FUNCTION H | FUNCTION I |
| SPECIFIED VALUE | 80% | 65% | 70% |

COMMUNICATION RELAY DEVICE

CROSS-REFERENCE TO RELATED APPLICATION

This application claims priority to Japanese Patent Application No. 2023-190042 filed on Nov. 7, 2023, incorporated herein by reference in its entirety.

BACKGROUND

1. Technical Field

The present disclosure relates to communication relay devices.

2. Description of Related Art

A communication relay device of Japanese Unexamined Patent Application Publication No. 2004-030287 (JP 2004-030287 A) is located between an internal network and an external network. The communication relay device relays transmission and reception of data between a plurality of hosts on the internal network and the external network. The communication relay device also detects unauthorized intrusions into the internal network by monitoring the traffic volume per unit time between the internal network and the external network. Specifically, the communication relay device determines whether the traffic volume per unit time between the internal network and the external network is greater than a predetermined threshold. When the traffic volume per unit time between the internal network and the external network is greater than the predetermined threshold, the communication relay device determines that communication is abnormal, that is, there is an unauthorized intrusion.

SUMMARY

In such a system as described in JP 2004-030287 A, the traffic volume per unit time between the internal network and the external network may vary depending on the conditions of the internal network. In particular, when the technique of the communication relay device of JP 2004-030287 A is applied to a network system for a vehicle, the traffic volume per unit time that is relayed by the communication relay device tends to vary greatly depending on the operating conditions of the vehicle. Therefore, when the technique of the communication relay device of JP 2004-030287 A is applied to a network system for a vehicle, it is difficult to uniquely determine an appropriate threshold for determining that there is an unauthorized intrusion.

In order to solve the above issue, a communication relay device relays transmission and reception of data between a plurality of control devices on an in-vehicle network,

- determines that communication is abnormal when an index value indicating a traffic volume per unit time of the data being relayed is greater than a specified value,
- acquires service information for each of the control devices, the service information being information indicating a type of a function being executed by the control device, and
- sets a value of the specified value according to a plurality of pieces of the acquired service information.

In order to solve the above issue, a communication relay device

- relays transmission and reception of data between a plurality of control devices on an in-vehicle network,
- determines that communication is abnormal when an index value indicating a traffic volume per unit time of the data being relayed is greater than a specified value,
- determines in which of a plurality of predetermined operation modes a vehicle is operating, and
- sets a value of the specified value according to the operation mode in which the vehicle is operating.

With the above configuration, the value of the specified value is set by taking into account the operating conditions of the vehicle. It is therefore possible to appropriately determine the presence or absence of abnormal communication compared to, for example, the case where the specified value is set to a specific fixed value.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of Vehicle

Hereinafter, an embodiment of the present disclosure will be described with reference to FIGS. 1 to 5. First, a schematic configuration of a vehicle 100 will be described.

Figure 1:
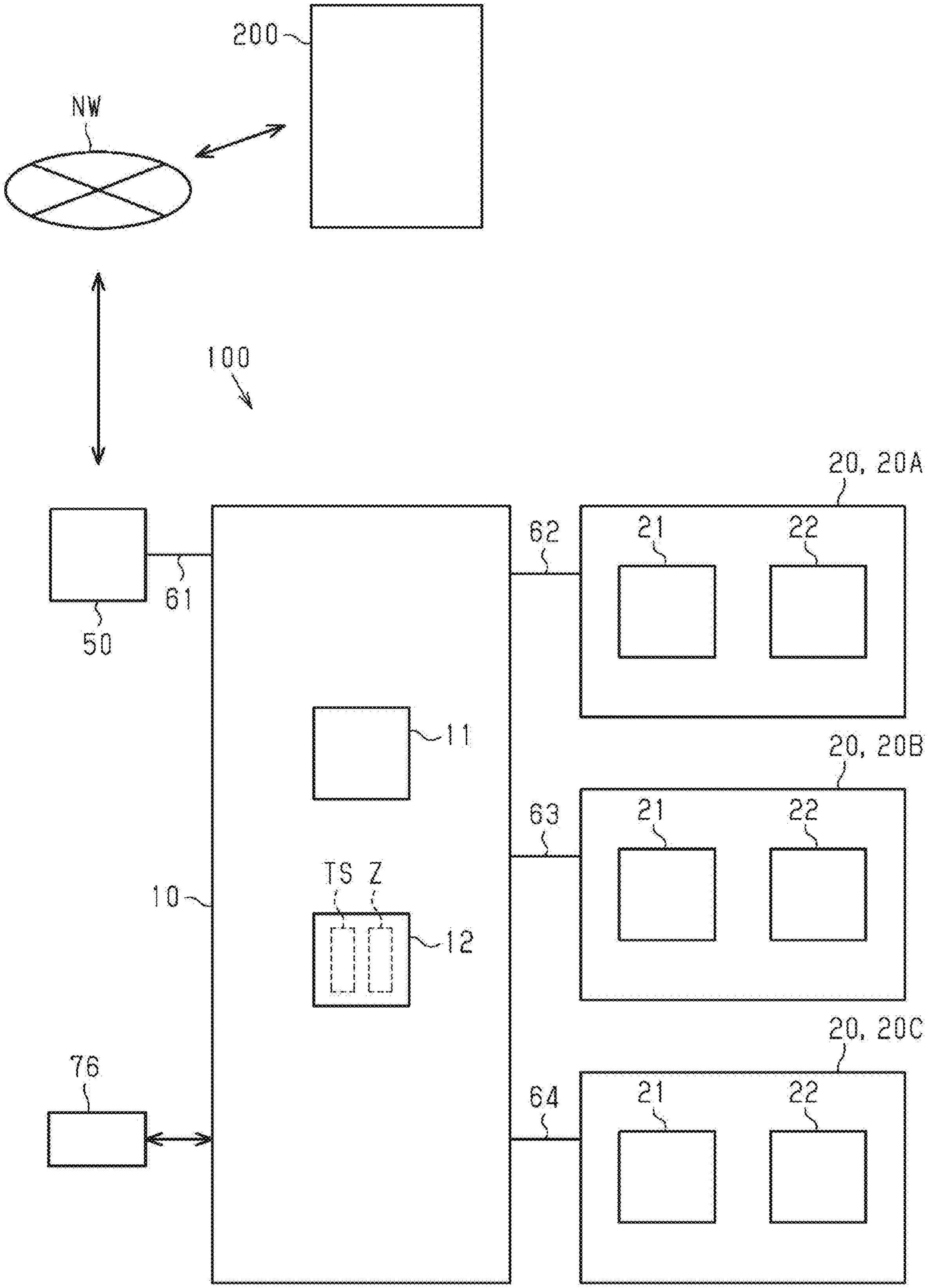
FIG. 1 is a schematic configuration diagram of a vehicle.

As illustrated in FIG. 1, the vehicle 100 includes a communication relay device 10, a plurality of control devices 20, a DCM 50, and a display 76. The vehicle 100 also includes a first external bus 61, a second external bus 62, a third external bus 63, and a fourth external bus 64. Note that "DCM" is an abbreviation for Data Communication Module.

The communication relay device 10 relays transmission and reception of data between the plurality of control devices 20 and DCM 50. The communication relay device 10 includes an execution device 11 and a storage device 12. An exemplary execution device 11 is a CPU. The storage device 12 includes ROM that can only be read, volatile RAM that can be read and written, and non-volatile storages that can be read and written. The storage device 12 stores various programs and various data in advance. Specifically, the storage device 12 stores the setting table TS and the initial value of the specified value Z in advance as various types of data. Here, the specified value Z is a threshold determined in advance for determination control described later. The setting table TS is a table for setting the specified value Z. The setting table TS will be described in detail later. The execution device 11 executes a program stored in the storage device 12 to realize various processes to be described later. An exemplary communication relay device 10 is a so-called central ECU, which is an ECU that comprehensively controls the whole of the vehicle 100. Note that ECU is an abbreviation for an electronic control unit.

DCM 50 is connected to the communication relay device 10 via the first external bus 61. Therefore, DCM 50 is also a control device on the in-vehicle networking. DCM 50 is capable of wirelessly communicating with an external device of the vehicle 100 via an external communication networking NW. Therefore, the communication relay device 10 can wirelessly communicate with an external device of the vehicle 100 via the first external bus 61 and DCM 50. An example of the external device is the server 200.

Each control device 20 includes an execution device 21 and a storage device 22. An exemplary execution device 21 is a CPU. The storage device 22 includes a ROM, a RAM, and storages. The storage device 22 stores various programs and various data in advance. The execution device 21 executes a program stored in the storage device 22 to realize various processes to be described later. Hereinafter, it is assumed that the vehicle 100 includes three control devices 20. An example of the three control devices 20 is an advanced driving assistance ECU, a meter ECU, and a multimedia ECU. In this specification, when a plurality of control devices 20 are collectively described, they are simply referred to as a control device 20. Further, when the plurality of control devices 20 are described separately, they are referred to as a first control device 20A, a second control device 20B, and a third control device 20C.

The first control device 20A can communicate with the communication relay device 10 via the second external bus 62. The second control device 20B can communicate with the communication relay device 10 via the third external bus 63. The third control device 20C can communicate with the communication relay device 10 via the fourth external bus 64. Therefore, each of the control devices 20 is a control device on the in-vehicle network.

The display 76 can display various types of information. In the present embodiment, the display 76 is located in the vicinity of the driver's seat of the vehicle 100. The communication relay device 10 outputs a control signal to the display 76 to display various kinds of information on the display 76.

Determination Control

Next, the determination control executed by the communication relay device 10 will be described with reference to FIG. 2. The determination control is a control for determining whether or not there is an unauthorized intrusion into the inside of the vehicle 100 from the outside of the vehicle 100. In the present embodiment, the communication relay device 10 starts the determination control at every predetermined control cycle.

Figure 2:
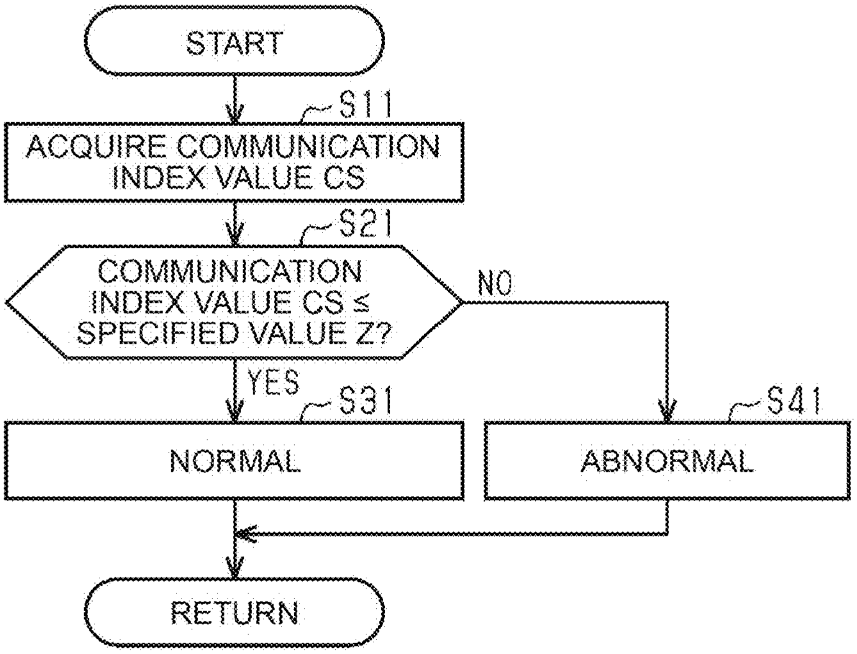
FIG. 2 is a flowchart showing determination control.

As illustrated in FIG. 2, when the determination control is started, the execution device 11 of the communication relay device 10 executes S11 process. In S11, the execution device 11 acquires the communication index value CS. Here, the communication index value CS is an index value indicating the traffic volume per unit time of data being relayed by the communication relay device 10. In the present embodiment, the communication index value CS indicates the ratio of the actual measured value of the traffic volume per unit time of the data to the upper limit value of the traffic volume per unit time of the data flowing from DCM 50 to the communication relay device 10 via the first external bus 61. Therefore, the communication index value CS is expressed by the following Expression (1).

(actual measurement of the traffic volume per unit time of data flowing from DCM 50 to the communication relay device 10 via the first external bus 61)/(upper limit value of the traffic volume per unit time of data flowing from DCM 50 to the communication relay device 10 via the first external bus 61)×100 Equation (1)

The upper limit of the traffic volume per unit time of the data flowing from DCM 50 to the communication relay device 10 via the first external bus 61 is determined in advance for the first external bus 61. An exemplary upper limit is "1000 Mbps". The communication index value CS is in units of "%". After S11, the execution device 11 advances the process to S21.

In S21, the execution device 11 determines whether or not the communication index value CS is equal to or less than a predetermined specified value Z. Here, the specified value Z is an initial value stored in the storage device 12 or a value set by setting control described later. In the present embodiment, the execution device 11 sets the specified value Z to the initial value stored in the storage device 12 in a period from when the communication relay device 10 is started to when the communication relay device completes the setting control described later. In other words, in a period from the start of the communication relay device 10 until the setting of the value of the specified value Z according to the service information IS to be described later, the execution device 11 sets the initial value stored in the storage device 12 as the specified value Z instead of the value of the specified value Z that is set according to the service information IS. In the present embodiment, the initial value stored in the storage device 12 is a value larger than the maximum value of the specified value Z that is settable according to the service information IS. An example of the initial value stored in the storage device 12 is "90%". In S21, when the execution device 11 determines that the communication index value CS is equal to or less than the specified value Z (S21: YES), the execution device 11 advances the process to S31.

In S31, the execution device 11 determines that the communication is normal. In other words, the execution device 11 determines that there is no unauthorized intrusion from the outside of the vehicle 100 into the inside of the vehicle 100. After S31, the execution device 11 ends the current determination control.

On the other hand, in the above-described S21, when the execution device 11 determines that the communication index value CS is larger than the specified value Z (S21: NO), the execution device 11 advances the process to S41.

In S41, the execution device 11 determines that the communication is abnormal. In other words, the execution device 11 determines that there is an unauthorized intrusion from the outside of the vehicle 100 into the inside of the vehicle 100. Further, the execution device 11 notifies the user of the vehicle 100 or the like that the communication is abnormal. For example, the execution device 11 outputs a control signal to the display 76 to display that the communication is abnormal on the display 76. After S41, the execution device 11 ends the current determination control.

Acquisition Control

Next, acquisition control executed by the communication relay device 10 and the plurality of control devices 20 will be described with reference to FIG. 3. The acquisition control is a control for the communication relay device 10 to acquire the service information IS used in the setting control described later. In the present embodiment, the control device 20 starts acquisition control every predetermined control cycle.

Figure 3:
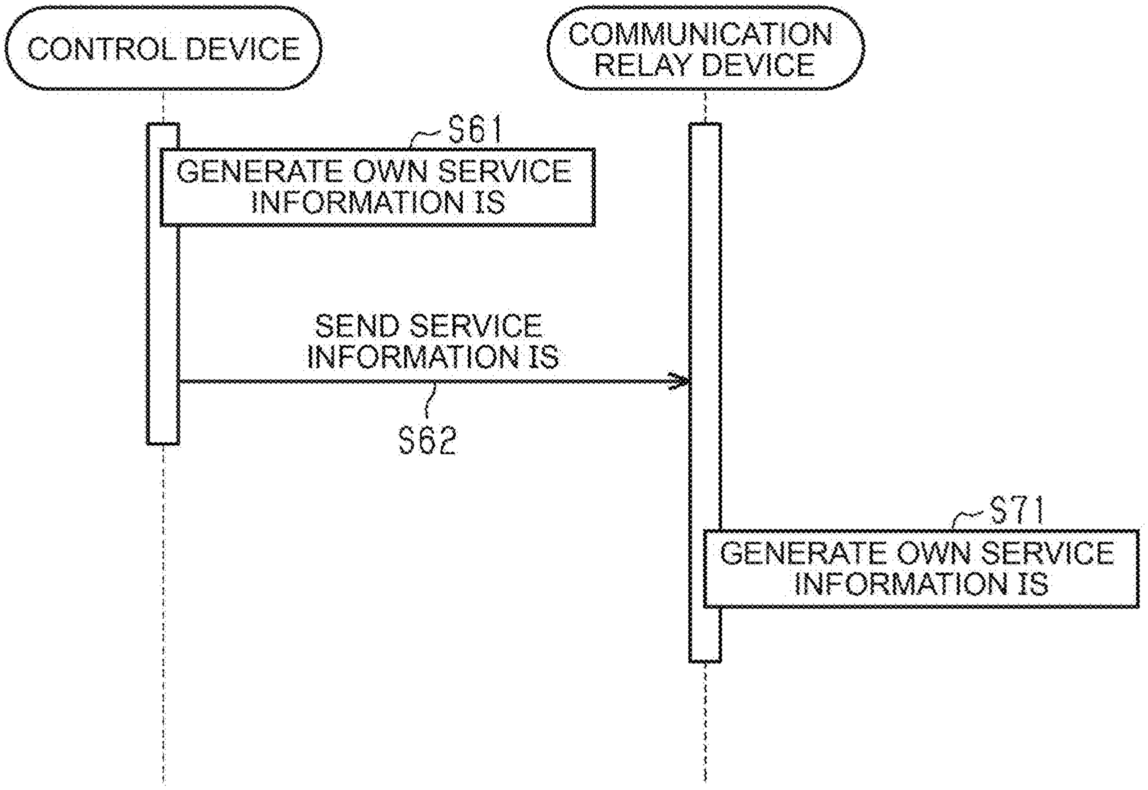
FIG. 3 is a sequence diagram illustrating acquisition control.

As illustrated in FIG. 3, the execution device 21 of the control device 20 executes S61 process when the acquiring control is started. In S61, the execution device 21 of the control device 20 generates service information IS indicating the type of the function being executed by the execution device 21. The service information IS indicating the type of the function being executed by the execution device 21 corresponds to the first service information. As described above, DCM 50 is a control device on the in-vehicle network. However, in the present embodiment, DCM 50 does not generate the service information IS because the DCM 50 can execute only one type of function. After S61, the execution device 21 advances the process to S62.

In S62, the execution device 21 of the control device 20 transmits the service information IS generated by S61 to the communication relay device 10. Each of the execution devices 21 of the three control devices 20 executes S61 and S62 processes in parallel. That is, the execution device 11 of the communication relay device 10 can acquire the service information IS generated by S61 for each control device 20. Then, when the execution device 11 of the communication relay device 10 acquires the service information IS, the process proceeds to S71.

In S71, the execution device 11 of the communication relay device 10 generates service information IS indicating the type of the function being executed by the execution device 11. In other words, in S71, the execution device 11 acquires the service information IS indicating the type of the function being executed by the execution device 11. Note that the service information IS indicating the type of the function being executed by the execution device 11 corresponds to the second service information. After S71, the execution device 11 ends the current acquiring control.

Setting Control

Next, the setting control executed by the communication relay device 10 will be described with reference to FIG. 4. The setting control is a control for setting the specified value Z. In the present embodiment, the communication relay device 10 starts the setting control every time the acquisition control is ended.

Figures 4, 5:
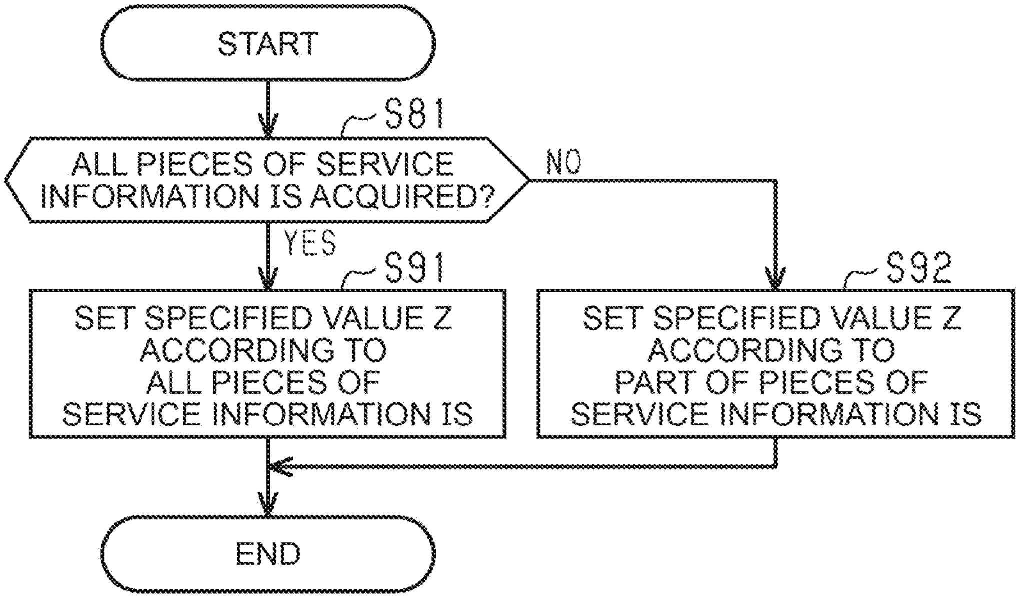
FIG. 4 is a flow chart showing setting control.
FIG. 5 is an explanatory diagram of a setting table.

As illustrated in FIG. 4, when the setting control is started, the execution device 11 of the communication relay device 10 executes S81 process. In S81, the execution device 11 determines whether a total of four pieces of service information IS have been acquired by the acquisition control. In S81, when the execution device 11 determines that a total of four pieces of service information IS have been acquired by the acquisition control (S81: YES), the execution device 11 advances the process to S91.

In S91, the execution device 11 of the communication relay device 10 sets the value of the specified value Z according to the three pieces of service information IS for the three control devices 20, the service information IS for the communication relay device 10, and the setting table TS. Here, as shown in FIG. 5, the setting table TS defines the relation between the combination of the four pieces of service information IS and the operation mode of the vehicle 100. The setting table TS defines the specified value Z according to the operation mode of the vehicle 100. In other words, the setting table TS indicates the relation between the combination of the four pieces of service information IS and the specified value Z. In the present embodiment, the first to third operation modes are determined in advance as the operation mode of the vehicle 100. An example of the first to third operation modes is a normal operation mode, an automatic operation mode, and an automatic valley parking mode.

Specifically, in S91, first, the execution device 11 of the communication relay device 10 determines the operation mode of the vehicle 100 by associating the types of functions indicated by the total of four pieces of service information IS with the setting table TS. In other words, the execution device 11 determines in which operation mode the vehicle 100 is operating among a plurality of predetermined operation modes. Then, the execution device 11 sets the value of the specified value Z according to the operation mode in which the vehicle 100 is operating. For example, as shown in FIG. 5, the types of functions exhibited by the four pieces of service information IS are function A, function C, function F, and function H in the order of the first control device 20A, the second control device 20B, the third control device 20C, and the communication relay device 10. In this case, the execution device 11 of the communication relay device 10 determines that the operation mode of the vehicle 100 is the first operation mode by associating the type of the function indicated by the four pieces of service information IS with the setting table TS. Further, the execution device 11 identifies "80%" as a candidate for the specified value Z by associating the operation mode of the vehicle 100 with the setting table TS. Then, the execution device 11 sets the specified value Z to "80%" that is the identified value. As illustrated in FIG. 4, after S91, the execution device 11 ends the current setting control.

On the other hand, when the execution device 11 determines in S81 that the four pieces of service information IS cannot be acquired by the acquisition control (S81: NO), the execution device 11 advances the process to S92. In other words, when the execution device 11 acquires only a part of the total of four pieces of service information IS to be associated with the setting table TS, the process proceeds to S92. An example of a situation in which a negative determination is made in S81 is a situation in which, although the acquisition control is executed, the service information IS cannot be appropriately acquired due to, for example, a defect in the data of the service information IS or the interruption of communication with the control device 20.

In S92, the execution device 11 of the communication relay device 10 sets the value of the specified value Z according to a part of the service information IS and the setting table TS. At this time, when only the acquired part of the service information IS is associated with the setting table TS and there is one candidate for the specified value Z, the execution device 11 sets the specified value Z to the candidate for the specified value Z. For example, it is assumed that the execution device 11 of the communication relay device 10 is unable to acquire the service information IS from the first control device 20A. It is assumed that the types of functions indicated by the three pieces of service information IS acquired by the execution device 11 are the function C, the function F, and the function H in the order of the second control device 20B, the third control device 20C, and the communication relay device 10. In this case, the execution device 11 of the communication relay device 10 determines that the operation mode of the vehicle 100 is the first operation mode by associating only the service information IS of the second control device 20B, the third control device 20C, and the communication relay device 10 with the setting table TS. Further, the execution device 11 identifies "80%" as a candidate for the specified value Z by associating the operation mode of the vehicle 100 with the setting table TS. Then, the execution device 11 sets the specified value Z to "80%" that is the identified value.

Further, when there is a plurality of candidates for the specified value Z when only the acquired part of service information IS is associated with the setting table TS, the execution device 11 sets the specified value Z to the largest value out of the plurality of candidates for the specified value Z. For example, it is assumed that the execution device 11 of the communication relay device 10 is unable to acquire the service information IS from the second control device 20B. It is assumed that the types of functions indicated by the three pieces of service information IS acquired by the execution device 11 are the function A, the function F, and the function H in the order of the first control device 20A, the third control device 20C, and the communication relay device 10. In this case, the execution device 11 of the communication relay device 10 determines that the operation mode of the vehicle 100 is the first operation mode or the second operation mode by associating only the first control device 20A, the third control device 20C, and the service information IS of the communication relay device 10 with the setting table TS. Further, the execution device 11 identifies "80%" and "65%" as candidates for the specified value Z by associating the operation mode of the vehicle 100 with the setting table TS. Then, the execution device 11 sets the specified value Z to the largest value, "80%" out of "80%" and "65%" that are the plurality of candidates for the specified value Z. After S92, the execution device 11 ends the current setting control.

Operations of Present Embodiment

As illustrated in FIG. 3, in S71 from S61 of the acquisition control, the execution device 11 of the communication relay device 10 acquires the service information IS indicating the type of the function being executed by the control device 20 and the service information IS indicating the type of the function being executed by the communication relay device 10. When the execution device 11 of the communication relay device 10 is able to acquire a total of four pieces of service information IS, as shown in FIG. 4, the execution device 11 sets the value of the specified value Z according to the total of four pieces of service information IS in the setting control S91. Specifically, the execution device 11 determines the operation mode of the vehicle 100 by associating the types of functions indicated by the total of four pieces of service information IS with the setting table TS. Further, the execution device 11 identifies candidates for the specified value Zby associating the operation modes of the vehicle 100 with the setting table TS. Then, the execution device 11 sets the specified value Z to the identified value.

Effects of Present Embodiment (1) In the vehicle 100, even if the communication is normal, the communication index value CS may change according to the state of the operation of the vehicle 100, specifically, according to the function being executed by the control device 20. According to the present embodiment, the value of the specified value Z is set according to the service information IS indicating the type of the function being executed by the control device 20. In other words, the value of the specified value Z is set in consideration of the state of operation of the vehicle 100. Accordingly, even if the communication index value CS changes according to the function being executed by the control device 20, the value of the specified value Z is set according to the change in the communication index value CS. As a result, it is possible to appropriately determine the presence or absence of an abnormality in communication in the determination control as compared with, for example, a case where the specified value Z is set to a specific fixed value.

(2) In the vehicle 100, the communication index value CS may change according to not only the function being executed by the control device 20 but also the function being executed by the communication relay device 10. In this regard, the execution device 11 of the communication relay device 10 sets the value of the specified value Z according to the service information IS indicating the type of the function being executed by the control device 20 and the service information IS indicating the type of the function being executed by the communication relay device 10. As a result, the value of the specified value Z can be set more accurately considering the state of operation of the vehicle 100.

(3) If the execution device 11 of the communication relay device 10 acquires only part of the total of four pieces of service information IS by the acquisition control, there may be a plurality of candidates for the specified value Z when only the acquired part of the service information IS is associated with the setting table TS. Then, for example, when the execution device 11 sets the specified value Z to the smallest value out of the plurality of candidates for the specified value Z, there is a possibility that the communication index value CS is determined to be larger than the specified value Z despite normal communication due to the fact that the specified value Z is smaller than the true specified value Z to be set.

In this regard, in S92, the execution device 11 of the communication relay device 10 acquires only part of the total of four pieces of service information IS by the acquisition control. When there is a plurality of candidates for the specified value Z when only the acquired part of the pieces of service information IS is associated with the setting table TS, the execution device 11 of the communication relay device 10 sets the specified value Z to the largest value out of the candidates for the specified value Z. Thus, it is possible to prevent the communication index value CS from being determined to be larger than the specified value Z S21 the determination control even though the communication is normal. In other words, it is possible to prevent the communication from being determined to be abnormal in the determination control even though the communication is normal.

(4) The execution device 11 of the communication relay device 10 sets the specified value Z to the initial value stored in the storage device 12 instead of the value of the specified value Z that is set according to the service information IS in a period from when the communication relay device 10 is started to when the communication relay device sets the value of the specified value Z according to the service information IS. Therefore, there does not occur a situation in which a series of determination controls cannot be executed because the specified value Z is not set.

(5) The initial value of the specified value Z stored in the storage device 12 is a value larger than the maximum value of the specified value Z that is settable according to the service information IS. By setting the initial value of the specified value Z to a relatively large value as described above, it is possible to prevent the communication index value CS from being determined to be larger than the specified value Z S21 the determination control even though the communication is normal. On the other hand, the initial value is set for a relatively short period until the value of the specified value Z is set according to the service information IS in the setting control. Therefore, even if the initial value of the specified value Z is set to a relatively large value, the appropriate specified value Z is set immediately thereafter.

Modifications

The present embodiment can be realized with the following modifications. The present embodiment and the following modifications can be combined with each other within a technically consistent range to be realized.

In the above embodiment, the determination control may be changed. For example, the communication index value CS in S11 may be changed. As a specific example, the communication index value CS may indicate a ratio of an actual measured value of the traffic volume per unit time of the data to an upper limit value of the traffic volume per unit time of the data flowing to both DCM 50 and the communication relay device 10 via the first external bus 61. In other words, the communication index value CS may be a value indicating a ratio of the data to be transmitted and received, rather than the data to be received. In addition, as a specific example, the communication index value CS may be not a ratio but an actual measurement value of a traffic volume per unit time of data flowing from DCM 50 to the communication relay device 10 via the first external bus 61.

Further, as a specific example, the target of the communication index value CS may be changed. First, it is assumed that the vehicle 100 is provided with other communication devices connected to the first control device 20A separately from DCM 50. It is assumed that the communication relay device 10 can wirelessly communicate with an external device of the vehicle 100 via the second external bus 62, the first control device 20A, and the above communication device. In this configuration, in S11, the execution device 11 of the communication relay device 10 may acquire the communication index value CS corresponding to the second external bus 62 in addition to or instead of the communication index value CS corresponding to the first external bus 61. Here, the execution device 11 may execute S21 and subsequent processes on the acquired communication index value CS.

For example, the initial value of the specified value Z may be changed. The initial value of the specified value Z may be the same value as the maximum value of the specified value Z that is settable according to the service information IS by the setting control, or may be a value smaller than the maximum value. However, from the viewpoint of suppressing determination that the communication index value CS is larger than the specified value Z despite normal communication, it is preferable that the initial value of the specified value Z be equal to or larger than the maximum value of the specified value Z that is settable according to the service information IS by setting control.

For example, the execution condition of the determination control may be changed. As a specific example, the execution device 11 of the communication relay device 10 may start the determination control on the assumption that the specified value Z is set by the setting control as a necessary condition.

In the above embodiment, the acquisition control may be changed. For example, in the acquisition control, the execution device 11 of the communication relay device 10 may acquire other service information IS. As a specific example, when there is a plurality of types of functions that can be executed by DCM 50, the execution device 11 of the communication relay device 10 may acquire the service information IS indicating the type of the function that DCM 50 is executing.

For example, S71 process may be omitted. As a specific example, when the change in the communication index value CS corresponding to the function being executed by the communication relay device 10 is relatively small, the effect is small even if S71 process is omitted.

In the above embodiment, the acquisition control may be omitted. For example, the following configuration can be adopted in the vehicle 100. First, the execution device 11 of the communication relay device 10 determines an operation mode of the vehicle 100. Subsequently, the execution device 11 of the communication relay device 10 outputs an instruction signal corresponding to the determined operation mode to the plurality of control devices 20. Further, the execution device 21 of each control device 20 executes various functions according to the acquired instruction signal. Here, in the above-described configuration, even if the acquisition control is omitted, the execution device 11 of the communication relay device 10 can grasp the operation mode of the vehicle 100 determined by the execution device 11. Therefore, after omitting the acquisition control, the execution device 11 may determine in which operation mode the vehicle 100 is operating from among a plurality of predetermined operation modes. Then, the execution device 11 may set the value of the specified value Z according to the operation mode in which the vehicle 100 is operating.

In the above embodiment, the setting control may be changed. For example, in S92, when there is a plurality of candidates for the specified value Z when only the acquired part of the pieces of service information IS is associated with the setting table TS, the execution device 11 may not set the specified value Z to the largest value out of the candidates for the specified value Z. As a specific example, the execution device 11 may set the specified value Z to a value other than the largest value out of the plurality of candidates for the specified value Z. In addition, as a specific example, the execution device 11 may set the specified value Z to the initial value stored in the storage device 12 instead of the plurality of candidates for the specified value Z in association with the setting table TS. In order to reduce the possibility of the communication index value CS being determined to be larger than the specified value Z even though communication is normal, it is preferable that the execution device 11 sets the specified value Z to a value equal to or larger than the largest value out of the plurality of candidates for the specified value Z.

For example, S81 process may be omitted. As a specific example, in S62 of the acquisition control, the execution device 11 of the communication relay device 10 may advance the process to S71 on condition that a total of three pieces of service information IS have been acquired. In this case, S81 and S92 processes can be omitted. In this configuration, the execution device 11 of the communication relay device 10 may execute S91 process when the setting control is started.

In the above embodiment, the configuration of the vehicle 100 may be changed.

For example, the number of operation modes included in the setting table TS may be changed. Specifically, the number of operation modes included in the setting table TS may be two, or four or more. Further, for example, the type of the operation mode included in the setting table TS may be changed.

For example, the number of control devices 20 included in the vehicle 100 may be changed. As a specific example, the number of the control devices 20 included in the vehicle 100 may be two, or four or more. Further, for example, the type of the control device 20 included in the vehicle 100 may be changed.

What is claimed is:

1. A communication relay device comprising:

a processor configured to:

relay transmission and reception of data between a plurality of target control devices on an in-vehicle network;

acquire a first measured data traffic volume per unit time flowing from a data communication module (DCM) to the communication relay device via a first external bus;

calculate an index value based on the first data traffic volume per unit time, the index value indicating a ratio of the measured first data traffic volume per unit time to an upper limit value of the first data traffic volume per unit time flowing from the DCM to the communication relay device via the first external bus; and acquire service information from each of the target control devices, the service information of each target control device indicating a type function executed by the respective target control device, and set a specified value according to a plurality of pieces of the acquired service information, wherein the processor determines that an unauthorized intrusion into the in-vehicle network has occurred when the calculated index value is greater than the specified value.

2. The communication relay device according to claim 1, wherein the processor is further configured to:

store in advance a setting table that indicates a relationship between a combination of the pieces of the service information and the specified value, and the specified value by associating the acquired service information with the setting table, wherein when only part of the pieces of the service information to be associated with the setting table is acquired, and there is a plurality of candidates for the specified value as a result of associating the acquired part of the pieces of the service information with the setting table, the processor sets the specified value to a largest value out of the candidates for the specified value.

3. The communication relay device according to claim 2, further comprising; a memory, wherein the processor is further configured to set the specified value to an initial value stored in the memory instead of the value other than the largest value out of the candidates for the specified value candidates for the specified value.

4. The communication relay device according to claim 1, wherein the processor is further configured to:

acquire communication relay device service information indicating a type of function executed by the communication relay device, and set the specified value according to a plurality of pieces of the acquired service information and the acquired communication relay device service information.

5. The communication relay device according to claim 1, wherein in a period from when the communication relay device is started to when the communication relay device sets the value of the specified value according to the service information, the communication relay device sets the specified value to an initial value instead of the value of the specified value that is set according to the service information; and the initial value is a value equal to or greater than a maximum value of the specified value that is settable according to the service information.

6. The communication relay device according to claim 1, wherein the processor is further configured to acquire a second measured data traffic volume per unit time flowing from the communication relay device to the DCM via the first external bus.

7. A communication relay device comprising:

a processor configured to:

relay transmission and reception of data between a plurality of target control devices on an in-vehicle network;

acquire a measured first data traffic volume per unit time flowing from a data communication module (DCM) to the communication relay device 10 via a first external bus; and calculate an index value based on the first data traffic volume per unit time, the index value indicating a ratio of the measured first data traffic volume per unit time to an upper limit value of the first data traffic volume per unit time flowing from the DCM to the communication relay device via the first external bus;

determine an operation mode in which a vehicle is operating;

output instruction signals corresponding to the identified operation mode to the plurality of target control devices to control the plurality of target control devices to execute functions according to the instruction signals; and sets a specified value according to the identified operation mode of the vehicle, wherein the processor determines that an unauthorized intrusion into the in-vehicle network has occurred when the calculated index value is greater than the specified value.

* * * * *